June 9, 1942. F. E. BEST 2,285,799
HIGH VELOCITY BLOWER
Filed Feb. 6, 1940 2 Sheets-Sheet 1

INVENTOR.

June 9, 1942.  F. E. BEST  2,285,799
HIGH VELOCITY BLOWER
Filed Feb. 6, 1940  2 Sheets-Sheet 2

Frank Ellison Best
INVENTOR.

Patented June 9, 1942

2,285,799

UNITED STATES PATENT OFFICE 2,285,799

HIGH VELOCITY BLOWER

Frank Ellison Best, Indianapolis, Ind.

Application February 6, 1940, Serial No. 317,580

10 Claims. (Cl. 230—125)

My invention relates to blowers and an object of my invention is to provide a blower that is highly efficient in imparting velocity to air.

Another object is to provide a blower that has a power unit for driving said blower built within the central portion thereof.

Another object is to provide a highly efficient blower which takes in the air through intake conduits positioned adjacent the periphery of the blower and discharges said air through discharge conduits positioned adjacent the periphery of the blower and alongside of the inlet conduits, this being in contrast to the usual blower in which the air is taken in through the central portion of the blower.

Another object is to provide a blower having impeller vanes of novel and highly efficient construction.

Another object is to provide an efficient blower having a centrally contained power unit which may be an electric motor, an internal combustion motor, or any of several power generating devices disclosed in my patent applications co-pending herewith.

This device is particularly adapted as a direct reaction means capable of sucking air in from any desired direction and discharging same at high velocities in the reverse or any other desirable direction as a rocket or direct reaction means for lifting or propulsion uses.

Other objects of this invention will be apparent from the following description taken in connection with the accompanying drawings.

Drawings

In the accompanying drawings Figure 1 is a fragmentary view in longitudinal section of this blower taken on diametrical lines 1—1 of Figs. 5 and 6.

Like reference numerals designate like parts throughout the several views.

Description

Figure 1:
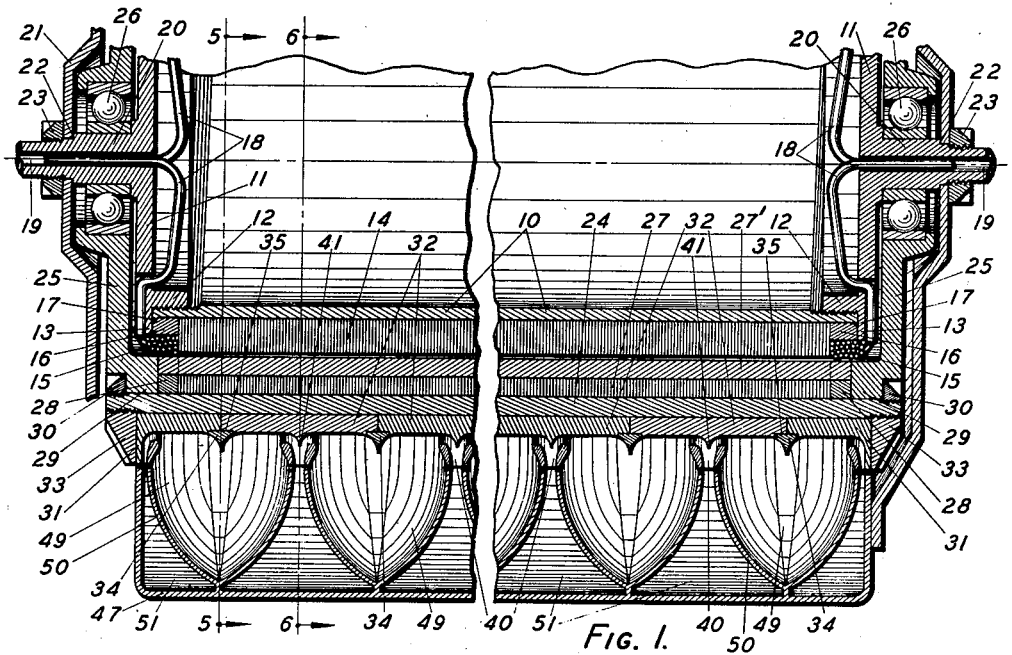

The device comprises stator parts positioned centrally of the machine and other stator parts positioned peripherally of the machine and rotor parts operatively disposed between the said stator parts.

The stator parts comprise a stator drum or cylinder 10 having two rigidly secured end walls 11. Each end wall 11 has an inwardly directed flange 12 which is externally threaded into an internally threaded end of the drum 10. A peripheral flange 13 on each end wall extends outwardly beyond the inwardly directed flange 12.

Supported on stator drum 10 are laminae 14 and coils 15 of a stator element of an ordinary electric motor. The laminae 14 is held in assembled relation by two end rings 16. The end rings 16 are retained on the drum 10 by expanded portions 17 on the ends of said drum 10.

Suitable conductors 18 enter the stator drum 10 through axial passageways 19 of hubs 20 that are provided on the stator end walls 11 for the purpose of supplying electrical energy to the motor.

The hubs 20 of the stator drum 10 are supported by stator end plates 21 that are securely clamped between shoulders 22 on said hubs 20 and nuts 23 which are threaded onto said hubs. The stator end plates 21 are also secured to external stator means, as hereinafter described. One stator end plate 21 is shown partly broken away in Fig. 7.

Positioned external to the inner stator member, just described, and extending around the same is a rotor member comprising the rotary part of electric motor and the rotary blower or turbine means for imparting a high velocity to air.

This rotor member comprises a rotary cylinder 24 extending around the central stator in spaced relation therefrom and supported by rotary end plates 25. The rotary end plates 25 are positioned between the stator end plates 21 and stator end walls 11 and are journaled in bearings 26 that are supported on the stator hubs 20.

Disposed within the rotary cylinder 24 in operative relation to the stator parts of the electric motor are the laminae 27, conductor bars 27¹ and conductor rings 28 of the rotor part of the electric motor. The laminae 27, conductor bars 27¹ and conductor rings 28 are fixedly secured between the peripheral portions 29 of the rotary end plates 25. Spanner rings 30 screw into the end portions of the rotary cylinder 24 against peripheral parts 29 of rotary end plates 25 and hold the rotary end plates 25 and cylinder 24 and rotor parts 27, 27¹ and 28 of the motor in assembled relation.

A plurality of cylindrical sleeves, comprising two end sleeves 31 and a plurality of intermediate sleeves 32, are mounted on the exterior of the rotary cylinder 24 and secured thereon in assembled relation by spanner nuts 33 that screw onto the ends of said rotary cylinder 24.

Rings 34 of somewhat triangular cross section but with concavely curved side faces are secured on the assembled ring members 31 and 32 with their apex portions directed outwardly. One of said rings 34 is supported in shallow notches 35 at the abutting ends of each two ring members 31 and 32. The rings 34 help to direct the air as hereinafter set forth. Also the rings 34 are preferably of very strong material, are press fitted or shrunk onto the sleeves 31 and 32 and reinforce and strengthen the high speed rotor.

Figure 2:
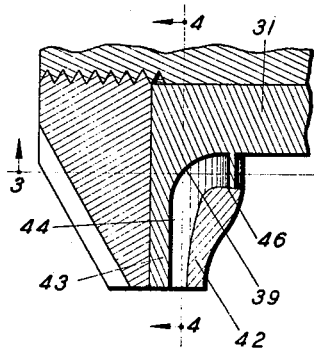
Fig. 2 is a detached fragmentary sectional view of part 31 and related elements, on a larger scale than shown in Fig. 1, showing details of the device, said Fig. 2 being taken substantially on broken line 2—2 of Fig. 3.
Figure 3:
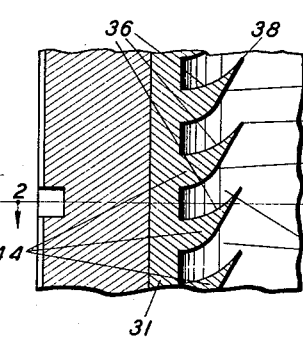
Fig. 3 is a fragmentary sectional view taken on broken line 3—3 of Fig. 2.
Figure 4:
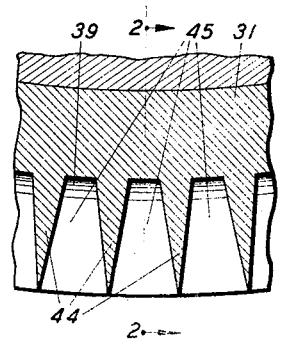
Fig. 4 is a fragmentary sectional view taken on broken line 4—4 of Fig. 2.

Each of the end sleeves 31 is constructed with outwardly extending air impeller means of a type shown in detail in Figs. 2, 3 and 4, and each of the intermediate sleeves 32 is constructed with outwardly extending air impeller means similar to that of the end plates except that it is equivalent to two of the air impeller devices of Figs. 2, 3 and 4 placed side by side and adapted for scooping up air from two sides, whereas the air impeller means on the end sleeves 31 only scoops up air from one side.

Each end sleeve 31 has a peripherally extending annular nozzle portion 43 provided with a plurality of side by side impeller blades 44, see Fig. 4, extending in a generally radial direction and forming therebetween passageways 45 for the flow of air. The axisward portion of each impeller blade 44 is cup shaped, as shown in Fig. 3, with a concave side 36, a convex side 37 and a sharp edge 38. The base portion of each impeller blade 44 is of substantial thickness at the location where the section shown in Fig. 3 is taken and said impeller blades taper in section to a thin edge at their peripheral portions, as shown in Fig. 4. The back walls of the passageways 45 are curved as shown at 39, Fig. 2.

When the rotor is rotated at high speed with the concave sides 36 of the blades 44 foremost and the sharp edges 38 pointing in the direction of rotation the inner portions of the blades will scoop in air and direct it peripheryward in an even and smooth stream and discharge it at high velocity from the outer portions of the blades.

Blades 40, of similar shape to the blades 44 except that they are double blades for scooping in air from two opposite sides thereof, are provided on the intermediate sleeve members 32. Annular flanges 41 on the sleeve members 32 provide curved air directing surfaces similar to the curved surfaces 39 previously described.

The blades 44 and 40 are all suitably shaped for engagement with ring members 42 which are shrunk over said blades. The inner surfaces 46 of the ring members 42 are slightly tapered, as shown in Fig. 2, and the blades 44 are correspondingly tapered so that after the ring members 42 have been shrunk onto the blades 44 and 40 there will be no possibility of them coming off. The ring members 42 are of the strongest material obtainable and are tightly shrunk onto the blades 44 and 40 so that they strengthen and reinforce the rotor structure. Two ring members 42 are provided on each blade 40. These ring members 42 are easily applied before the end sleeves 32 are assembled on the rotary cylinder 24. Also rings 34 are preferably made from material of great strength and press fitted or shrunk onto the sleeves 31 and 32 so that they reinforce and strengthen the rotor structure.

The rotor is surrounded by a spirally shaped outer shell 47 which is connected with a flat conduit member 48 that extends substantially tangentially from the spiral shell. The spiral shell 47 and conduit member 48 are stator parts and are secured to the end plates 21, as shown at the right in Fig. 1.

Figures 5, 6:
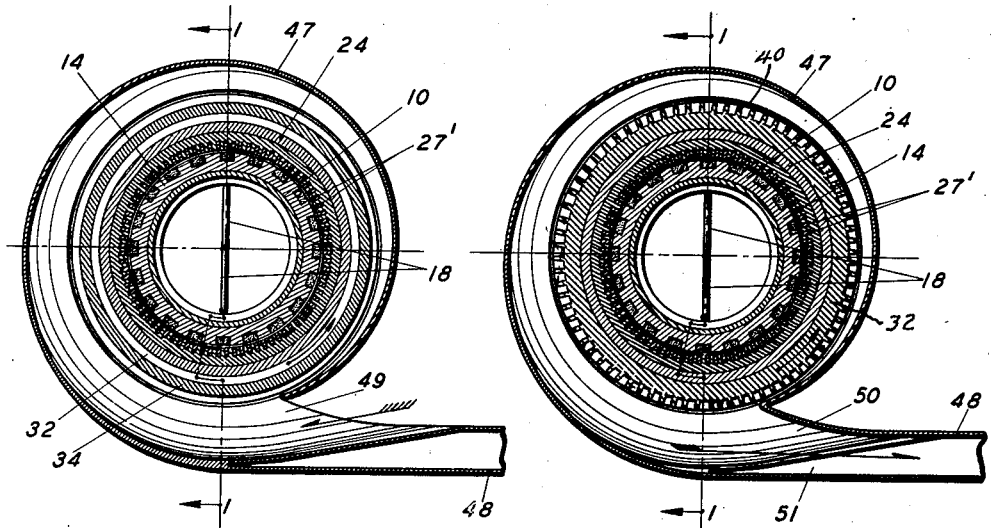
Fig. 5 is a transverse sectional view, on a smaller scale than Fig. 1, taken on broken line 5—5 of Fig. 1.
Fig. 6 is a view similar to Fig. 5 taken on broken line 6—6 of Fig. 1.
Figure 7:
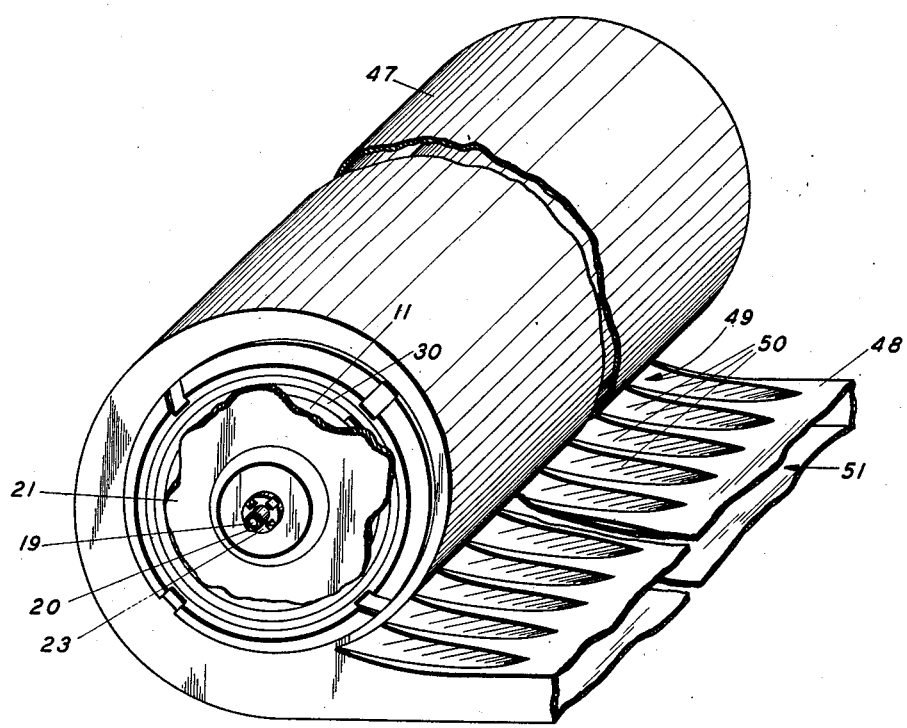
Fig. 7 is a cabinet projection of the exterior of my device, with parts broken away.

A plurality of air inlet passageways 49 are provided by curved wall members 50. These passageways 49 have trough like air inlet openings in the top wall of the conduit member 48 as shown in Figs. 5 and 7. Air discharge passageways 51 are provided between adjacent air intake passageways 49 and within the spiral shell 47. The air intake passageways 49 and air discharge passageways 51 are all positioned external to the periphery of the rotor and are disposed side by side within the shell 47 and extend circumferentially within the shell 47 and communicate with each other by way of the passageways between the impeller blades 40 and 44.

When the rotor is rotated at high speed in the direction indicated by the arrows in Figs. 5 and 6, the impeller blades will scoop air from the intake passageways 49 and discharge said air at high velocity through the discharge passageways 51 and out of the conduit 48.

The air enters the device through air inlet passageways 49 and is scooped up by the forwardly directed sharp edges 38 of the impeller blades 44 and the similar forwardly directed sharp edges of impeller blades 40 which are curved forward to produce a scooping action. It will be observed that the incoming air rushes into the device in a direction opposite to the direction of rotation of the rotor. The inertia of this incoming air intensifies the scooping action. The scooping action takes place in a cylindrical plane, corresponding generally to the plane 3—3 of Fig. 2, in which the centrifugal force of the fluid neither augments nor retards the said scooping action. From the scoops the air passes into radial passageways 45 where the centrifugal force of the fluid aids its circulation by impelling the fluid outward in said passageways 45.

The air is discharged at a very high velocity and this discharging air may be caused to react in any desired way to produce a useful result. For instance, it may be used to drive a turbine, it may be directed through a Venturi tube to provide compression in the second phase or stage of said tube, it may react against air or water to serve as a propulsion means, or it may be used in various other ways.

The blower structure herein disclosed is highly efficient in taking in air and imparting a very high velocity to the same. The air is picked up by the vanes, passes transversely and radially over said vanes from inlet passageways 49 to discharge passageways 51 and is discharged from the rotor at a very high velocity.

The vanes taper to relatively sharp edges at their peripheries, as shown in Fig. 4, so that there is a continuous and unbroken discharge of air from the peripheral portions of the vanes and losses due to eddies are substantially eliminated.

The air entering through inlet passageways 49 is moving in a direction substantially opposite to the direction of movement of the impeller blades but the blades are shaped so that they will pick this air up smoothly without turbulence, direct it sidewise and discharge it at high velocity through conduit means 51.

Having thus described my invention, what I claim as new and desire to protect by Letters Patent of the United States of America is:

1. In a blower, a driven cylindrical rotor, circular rows of peripherally projecting transversely curved air impeller blades transversely spaced apart on said rotor, and circular housing means enclosing said rotor, said housing means having air inlet and air outlet conduits positioned alongside of each other external to said rotor and relatively offset in directions parallel to the axis of said rotor and extending circumferentially partially around said rotor, whereby air from the air inlet conduits will be displaced transversely by said blades and discharged through the air outlet conduits.

2. In a blower, a power generator comprising a centrally positioned stator part, a rotor part rotatable around said stator part, air impeller blades on said rotor part, a stator shell surrounding said rotor part having air inlet and air outlet passageways operatively positioned alongside of each other and substantially tangential to the same side of the rotor and in air supplying and air receiving relation as respects said impeller blades, and end plate means connecting said stator part and said stator shell.

3. In a blower, a power generator comprising a centrally positioned stator part, a rotor part rotatable around said stator part, air impeller blades on said rotor part, and a stator shell extending around said rotor part and having air inlet and air outlet passageways positioned in side by side relation and extending circumferentially within said shell in operative position as respects said air impeller blades.

4. In a blower, a power generator comprising a centrally positioned stator part, a rotor part rotatable around said stator part, a stator shell extending around said rotor part and having air inlet and air outlet passageways positioned in side by side relation and extending circumferentially within said shell, and a plurality of curved air impeller blades provided on said rotor part, said blades having side portions positioned to pick up air from said air inlet passageways and peripheral portions positioned to discharge said air through said air outlet passageways.

5. In a blower, a stator shell having a plurality of circumferentially extending air inlet and air discharge conduits positioned side by side therein, said conduits being substantially tangential to the same part of said shell at the location where they connect with said shell and being of receding depth within said shell, and driven air impeller blades operable within said stator shell to remove air sidewise from said air inlet conduits and discharge air peripherally into said air discharge conduits.

6. In a blower, a stator shell having a plurality of circumferentially extending air inlet and air discharge conduits positioned side by side therein, said conduits being substantially tangential to the same part of said shell at the location where they connect with said shell and being of receding depth within said shell, a driven rotor within said shell, and air impeller blades on said rotor each having a side air intake portion positioned in registration with one of said air intake conduits and a peripheral air discharge portion positioned in registration with one of said air discharge conduits.

7. In a blower, a stator shell having a plurality of circumferentially extending air inlet and air discharge conduits positioned side by side therein, a driven rotor within said shell, and a plurality of spaced apart air impeller blades on said rotor having curved scoop like portions directed sidewise toward said air inlet conduits and having substantially radial portions terminating at said air discharge conduits whereby air will be scooped out of said air inlet passageways and transferred sidewise and radially and delivered into said air discharge passageways.

8. In a blower, a power generator comprising a centrally positioned stator part, a rotor part rotatable around said stator part, a plurality of ring sections mounted on said rotor part, air impeller blades provided on said ring sections, a spiral shell surrounding said rotor part, a plurality of air intake and air discharge conduits provided in said spiral shell in side by side circumferentially extending relation, said air impeller blades having scoop shaped side pick up portions positioned to pick up air from said air inlet conduits and having radial discharge portions positioned to deliver air into said air discharge conduits, and a relatively flat tangential air delivery conduit, connected with said air discharge conduits.

9. In a blower, a rotor, a plurality of air impeller blades on the peripheral portion of said rotor, and two reinforcing rings extending tightly around said air impeller blades supporting said blades for high speed rotation, said reinforcing rings being positioned in spaced apart relation and at the respective sides of said blades to provide between the two rings of each blade a passageway for discharging air.

10. In a blower, a driven rotor having a cylindrical exterior, a plurality of cylindrical sleeves fitting snugly over said rotor, reinforcing ring means extending around each two abutting ends of said cylindrical sleeves and fitting tightly thereon, a plurality of outwardly protruding spaced apart vanes on each of said sleeves, and reinforcing ring means extending tightly around the vanes on each sleeve.

FRANK ELLISON BEST.